(12) United States Patent
Vithayathil

(10) Patent No.: US 6,479,910 B1
(45) Date of Patent: Nov. 12, 2002

(54) METHOD AND CIRCUITS FOR CHANGING THE RATINGS OF A THREE PHASE CIRCUIT BY DELTA-STAR SWITCHING

(76) Inventor: John J. Vithayathil, 6685 W. Burnside, Unit #355, Portland, OR (US) 97210

( * ) Notice: Subject to any disclaimer, the term of this patent is extended or adjusted under 35 U.S.C. 154(b) by 0 days.

(21) Appl. No.: 09/565,157

(22) Filed: May 3, 2000

(51) Int. Cl.[7] .................................................. H02J 3/00
(52) U.S. Cl. ...................................... 307/139; 307/109
(58) Field of Search ................................ 307/139, 108, 307/110, 105; 318/771

(56) References Cited

U.S. PATENT DOCUMENTS

| | | | | |
|---|---|---|---|---|
| 1,849,519 A | * | 3/1932 | Gay | 318/771 |
| 1,927,208 A | * | 9/1933 | Gay | 318/771 |
| 2,182,646 A | * | 12/1939 | Shutt | 318/771 |
| 5,051,639 A | * | 9/1991 | Satake et al. | 310/112 |
| 5,065,305 A | * | 11/1991 | Rich | 318/771 |
| 5,068,559 A | * | 11/1991 | Satake et al. | 310/112 |
| 5,068,587 A | * | 11/1991 | Nakamura | 318/771 |
| 6,154,003 A | * | 11/2000 | Satake et al. | 318/771 |

FOREIGN PATENT DOCUMENTS

JP    61-121778    * 6/1986    ............. H02P/1/26

* cited by examiner

*Primary Examiner*—Fritz Fleming

(57) ABSTRACT

A switching scheme that permits a thee phase capacitor bank to have two ratings depending on whether the circuit is connected in delta or star configuration The capacitor per phase consists of two sections. In delta connection the two sections are connected in series. In the star connection the two sections are connected in parallel. Both the changes —the delta connection to the star connection of the circuit and the series connection of the capacitor sections to the parallel connection of the capacitor sections—are accomplished simultaneously by a single switching operation of three star connected switches. In the case of isolated neutral, the number of switches can be reduced from three to two.

3 Claims, 4 Drawing Sheets

METHOD AND CIRCUITS FOR CHANGING THE RATINGS OF A THREE PHASE CIRCUIT BY DELTA-STAR SWITCHING

BACKGROUND OF THE INVENTION

The present invention relates to a switching scheme in a three phase alternating current circuit. More specifically, the present invention is directed to rearranging a three phase circuit into delta and star connected circuits with minimal switches to provide two ratings to the circuit.

Typically three phase circuits are connected in delta or star. It is well-known that if the same three phase circuit is arranged to operate in either delta or star connection, the ratings of the circuit would be different. FIG. 1 shows a conventional and straight-forward switching arrangement that permits operation of a three phase circuit, with impedance Z ohms per phase, in delta or star configuration. When switches designated $S_d$ are closed and switches designated $S_s$ are open, the circuit is connected in delta. If the switches $S_d$ are open and switches $S_s$ are closed, the circuit will be connected in star. If the phase to neutral applied voltage $v_a$, $v_b$ and $v_c$ have an rms value of V volts, the voltage stress $v_d$ and the volt-ampere rating $P_d$ in the case of delta connection would be:

$$v_d = \sqrt{3}V/Z \text{ volts per ohm} \quad (1)$$

$$P_d = 9V^2/Z \quad (2)$$

The voltage stress $v_s$ and volt-ampere rating $P_s$ for the star connection would be:

$$v_s = V/Z \text{ volts per ohm} \quad (3)$$

$$P_s = 3V^2/Z \quad (4)$$

The changes in voltage ratings for the delta and star connection would be:

$$\frac{v_d}{v_s} = \sqrt{3} \quad (5)$$

$$\frac{P_d}{P_s} = 3 \quad (6)$$

An arrangement that gives two ratings for the same bank could be useful in certain circumstances. One application would be to increase the reactive power rating of the circuit when there is significant variation in applied voltages. A circuit connected star may be reconnected in delta to offset the reduction in power or reactive power due to drop in applied voltage. Another application would be to tap the temporary overload ratings of capacitor banks to cope with some temporary condition in the power system with or without change in the applied voltages. For example, during a disturbance in the power system, it may be possible to beneficially vary the reactive power output of a capacitor bank since capacitors typically have significant short term overload capability.

The method shown in FIG. 1 when applied to capacitor banks has a number of drawbacks. It needs a large number of switches with relatively high voltage ratings. Also, the changes in the voltage stress on the impedance elements and the volt-ampere ratings between the two connections are too large for many practical applications. A more modest change in the voltage stress comparable to permissible temporary overload ratings of the capacitors, would have better scope for practical application. The method also requires that the bank be temporarily disconnected during the changeover from one connection to the other. This could have objectionable system impact. For example, in switching a capacitor bank with two ratings, Q1 and Q2, Q2 being higher than Q1, the maximum switched block will be Q2, with corresponding system voltage change. Comparing this with two banks with ratings of Q1 and (Q2−Q1), for which the maximum switched block will be only Q1 or (Q2−Q1), this voltage change will be higher, and possibly objectionable. It is the objective of the present invention to overcome these drawbacks.

Large capacitor banks in power systems are made up of series and/or parallel connected capacitor units of lower voltage ratings. Such banks can be easily split into two sections of equal or unequal ratings. Two alternate arrangement for connecting those two capacitor sections, in one case tie two sections in series and in the other case the two sections in parallel, would facilitate having capacitor ban with dual ratings. In the present invention, delta—star switching different from the one shown in FIG. 1 is applied to capacitor banks to obtain benefits of reduced switching overvoltages, reduction in high voltage switchgear and ability to tap the inherent temporary overvoltage ratings of capacitors.

DETAILED DESCRIPTION OF THE INVENTION

The present invention applies to capacitor banks in which the capacitor in each phase can be split into two sections. According to present invention, in the delta connection the two capacitor sections are connected in series and, in the star connection the two impedances are connected in parallel. Both these changes—delta connection to star connection and series connection to parallel connection—are accomplished simultaneously by the single operation of three switching devices. The invention also covers the case where the number of switches can be reduced to two if the neutral of the star connected circuit is isolated.

Figure 2A:
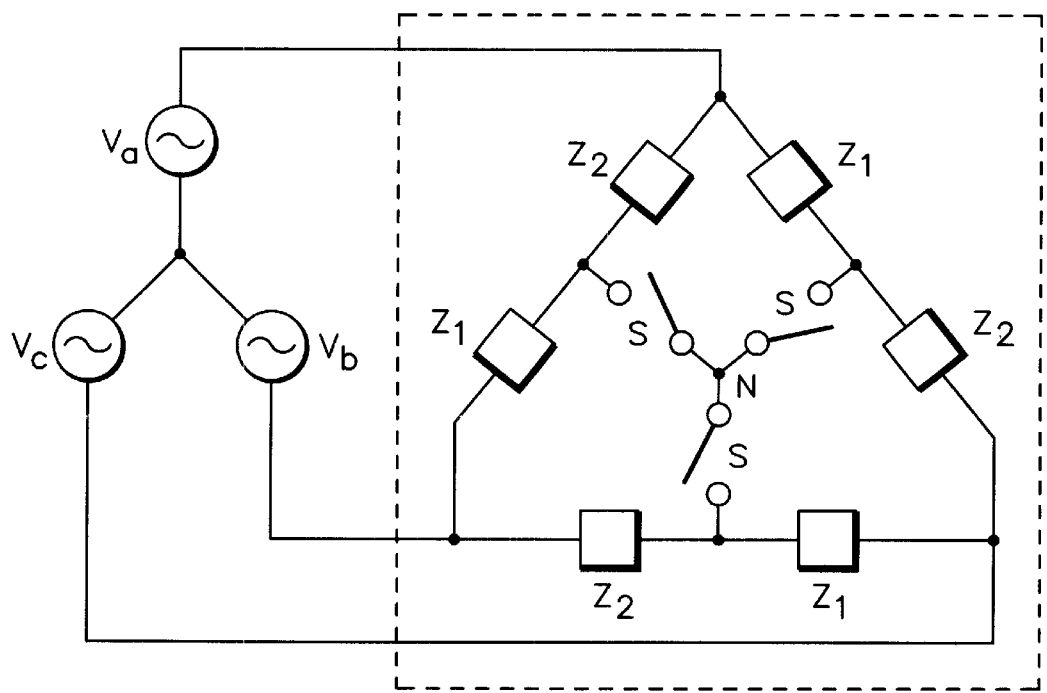
FIG. 2a shows the circuit of the present invention as it applies to a three phase capacitor bank forming; a symmetrical circuit. The capacitor in each phase is split into two sections with each denoted by its impedance values of $Z_1$ and $Z_2$. When the switches in FIG. 2a are open as shown, the circuit is delta connected with impedance between phases being the series connected impedances $Z_1$ and $Z_2$. When the switches in FIG. 2a are closed, the circuit becomes the star connected circuit with impedances $Z_1$ and $Z_2$ in parallel as shown in FIG. 2b.
Figure 2B:
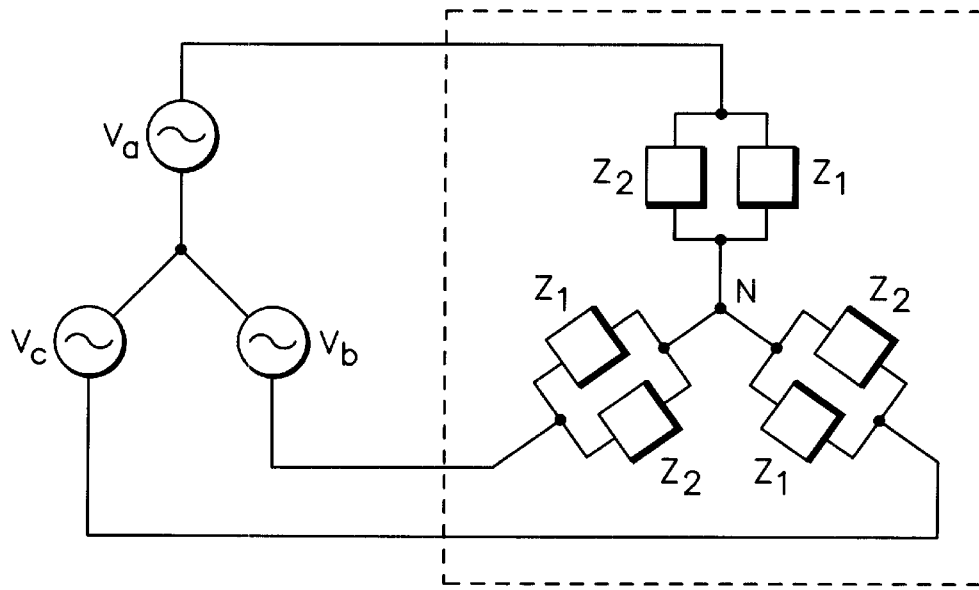

The invention can be explained with the aid of FIGS. 2a and 2b. For ease of presentation, the invention is first discussed as it applies to a symmetrical three phase circuit. However, the method is applicable to any three phase circuit in which the impedances per phase can be split into two. In FIGS. 2a and 2b the circuit of the invention is inside the part with dotted line borders.

FIG. 2a shows a symmetrical three phase circuit in which the impedance per phase are in two parts, $Z_1$ and $Z_2$. There are three switches, designated S, one terminal of each connected to a common point designated N. The other terminals of the three switches are connected to the three nodes connecting $Z_1$ and $Z_2$ of each phase.

When the switches are in open position, the three phase circuit is connected in delta with $Z_1$ and $Z_2$ connected in series. When the switches are in closed position, the three phase circuit is connected in star with $Z_1$ and $Z_2$ connected in parallel and N as the neutral point. This is shown in FIG. 2b.

The impedance between phases for delta connection is $(Z_1+Z_2)$. The impedance for the star connection is $Z_1Z_2/(Z_1+Z_2)$. For the same external applied voltage, the changeover from delta to star changes the voltage stress on the impedances and their volt-ampere rating. If the rms value of the applied phase to neutral voltage is V, the voltage stress on the impedance for delta connection, $V_d$, is $$v_d = \frac{\sqrt{3}V}{Z_1+Z_2} \text{ volts per ohm} \quad (7)$$

For the star connection, the voltage stresses on the impedances would be $v_{s1}$ for $Z_1$ and $v_{s2}$ for $Z_2$.

$$v_{s1} = \frac{V}{Z_1} \text{ volts per ohm} \quad (8)$$

$$v_{s2} = \frac{V}{Z_2} \text{ volts per ohm} \quad (9)$$

If $Z_1$ and $Z_2$ are equal, $v_{s1}$ and $V_{s2}$ will be equal and, $$v_s = v_{s1} = v_{s2} = \frac{2V}{Z_1+Z_2} \text{ volts per ohm} \quad (10)$$

Figure 1:
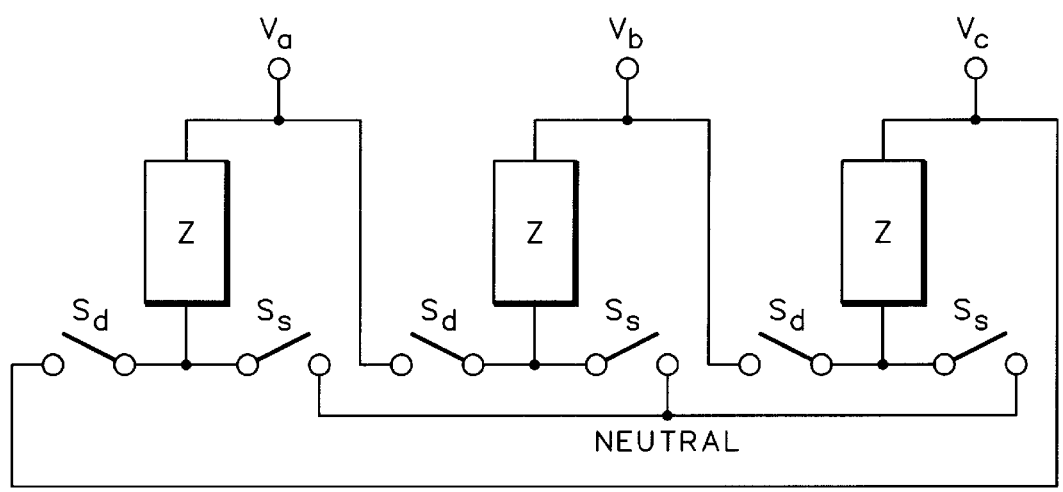
FIG. 1, identified as Prior Art, shows a known method of star-delta switching described in the previous section.

In this case, the voltage stress on all impedances in the star connection will be $2/\sqrt{3}$ (=1.155) times that for the delta connection. This is a much more moderate change in voltage stress than that for the method shown in FIG. 1, and suitable to exploit the inherent temporary 30-minute overload capacity of the capacitor banks as presented by industry standards.

If $P_d$ and $P_s$ are the volt-ampere ratings of the circuits for delta and star connection respectively, $$P_d = \frac{9V^2}{Z_1+Z_2} \quad (11)$$

$$P_s = \frac{3V^2(Z_1+Z_2)}{Z_1Z_2} \quad (12)$$

The ratio of the voltampere ratings for the two connections is $$\frac{P_s}{P_d} = \frac{(Z_1+Z_2)^2}{3Z_1Z_2} \quad (13)$$

For the case of $Z_1$ and $Z_2$ being similar impedances and, if we denote $Z_1=kZ$ and $Z_2=(1-k)Z$, where $Z=Z_1+Z_2$ and k a positive constant less than 1, $$\frac{P_s}{P_d} = \frac{1}{3k(1-k)} \quad (14)$$

$P_s/P_d$ is a minimum when k=0.5 or when $Z_1=Z_2$. When k=0.5,

Since the minimum value of $P_s/P_d$ is 4/3, unlike the previously considered known method of star-delta switching, the voltampere rating for the star connection is always higher. Furthermore, the arrangement according to present invention allows a more moderate change in the ratings between the delta and star connections.

As the expression for the ratio of $P_s/P_d$ in terms of k shows, the change in the voltampere ratings can be increased by changing the value of k. However, when k is different from 0.5, the voltage stress on $Z_1$ and $Z_2$ will be different, higher for the impedance with the smaller value and lower for the impedance with the higher value. Designating $Z_1$ as the impedance with the lower value, the maximum voltage stress for star connection, $v_s$, is The impedances could be linear or non-linear with or without supplementary control and protection elements. If they are non-linear, the formulas for the voltage stress and voltampere ratings will have to be adjusted accordingly.

Figure 3A:
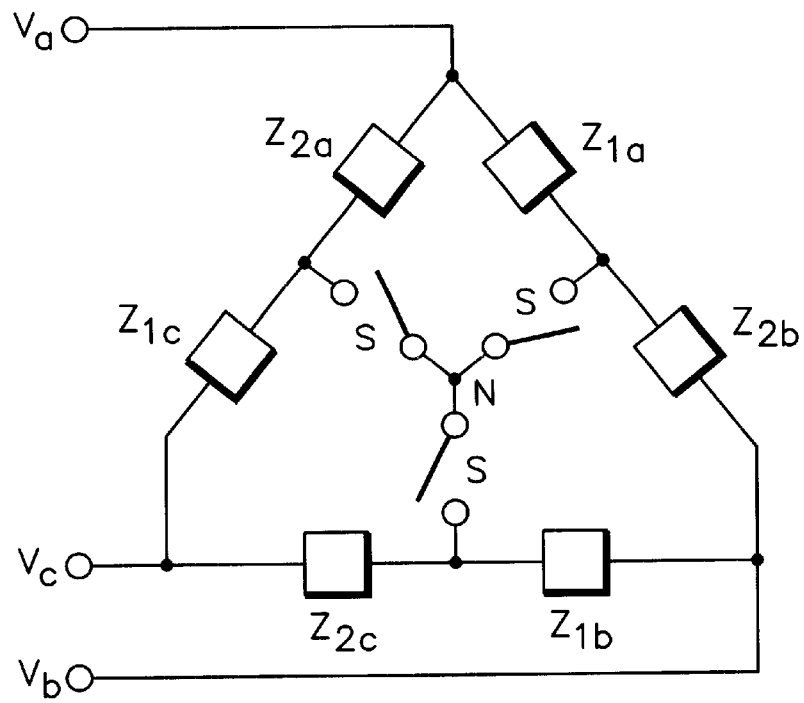
FIGS. 3a and 3b show the circuit of present invention for the general case of a three phase system with any degree of asymmetry.

The method is applicable to circuits with any degree of asymmetry also. This is explained with the aid of FIGS. 3a and 3b. In FIG. 3a, the impedance of each phase is shown as made up of two parts with additional subscript identification corresponding to the phase of the external circuit terminals to which they are connected, i.e., $Z_{1a}$ and $Z_{2a}$ for phase A, $Z_{1b}$ and $Z_{2b}$ for phase B and $Z_{1c}$ and $Z_{2c}$ for phase C. The impedance pairs for the series connection in delta will be ($Z_{1a}$ and $Z_{2b}$), ($Z_{1b}$ and $Z_{2c}$) and ($Z_{1c}$ and $Z_{2a}$). For the star connection, the parallel impedances combination pairs will be ($Z_{1a}$ and $Z_{2a}$), ($Z_{1b}$ and $Z_{2b}$) and ($Z_{1c}$ and $Z_{2c}$). This is shown in FIG. 3b.

Figure 3B:
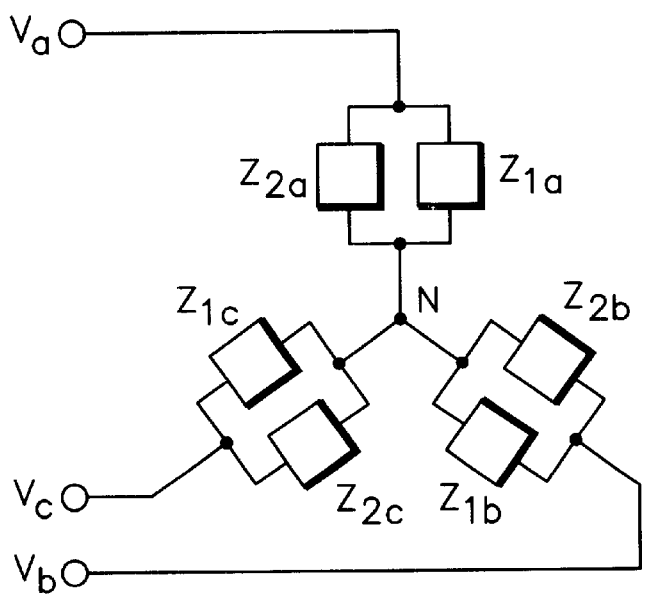

FIGS. 3a and 3b represent the general case while FIGS. 2a and 2b represent the special case where $Z_1=Z_{1a}=Z_{1b}=Z_{1c}$ and $Z_2=Z_{2a}=Z_{2b}=Z_{2c}$.

Figure 4:
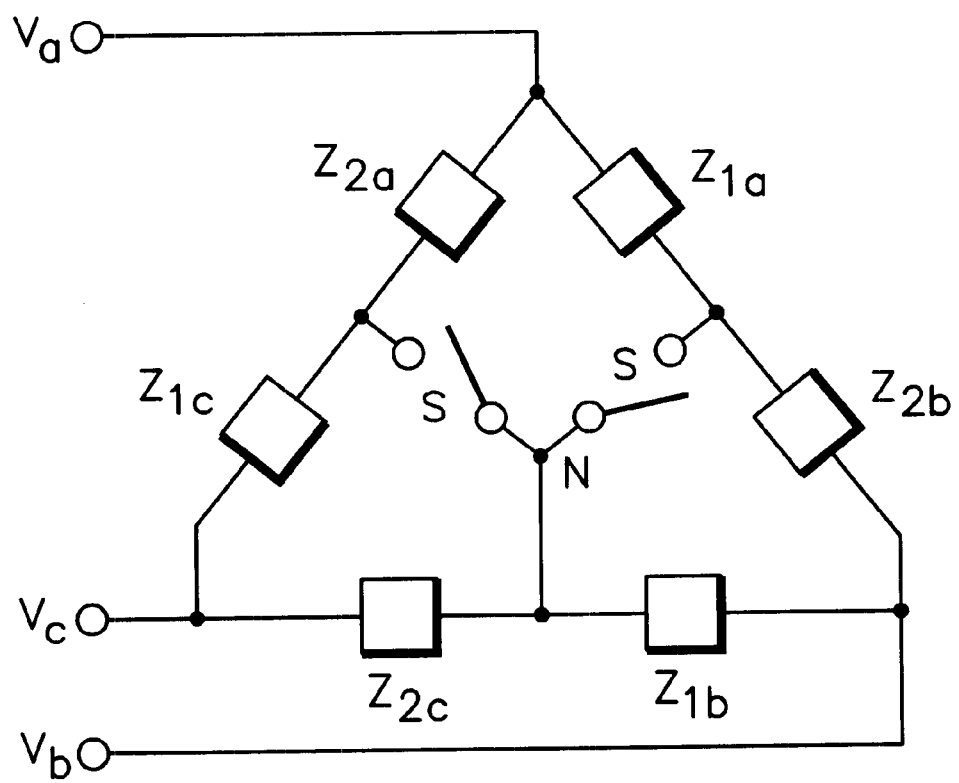
FIG. 4 shows the circuit of the present invention with only two switches for the case of isolated neutral.

The invention applies whether the neutral of the star connection is isolated or has an external connection to another circuit or ground. When the neutral of the circuit is isolated, an alternate arrangement of the invention would be to replace one of the three switches to the neutral by direct connection between the neutral and the node to which the replaced switch was connected. This arrangement is shown in FIG. 4. If the neutral point is to be connected to an external circuit or ground in the circuit shown in FIG. 4, it can be done through a switch which remains open in delta connection and closed for the star connection.

The term switch used in this description and in the claims of the present invention applies to any switching device which can effect electrical connection or disconnection of the circuit between the two terminals of the switch. They could be mechanical switches with moving parts such as vacuum switches or SF6 breakers, or static bi-directional electronic switches such as back-to-back connected thyristor valves. Such devices may have auxiliary control and protection elements associated with them for their proper operation. And their presence is within the spirit and scope of the present invention.

Any modifications within the spirit and scope of the claims set forth below are intended to be encompassed by these claims, the specification of the present application not being limitative of the invention of the present application.

I claim:

1. A three phase capacitor bank which can be configured into delta or star circuit, comprising:

two series connected capacitor sections between phases in delta connection;

three switches, one terminal of each connected to a common point and the other terminals connected separately to the three nodes at which the two capacitor sections in the delta connection are serially connected;

the three switches in open position making the circuit a delta connected with two capacitor sections in series between phases;

the three switches in closed position making the circuit a star connected circuit with the two capacitor sections in parallel per phase and the common point of connection of the switches as the neutral point.

2. A three phase capacitor bank which can be configured into delta or star circuit, comprising:

two series connected capacitor sections between phases in delta connection;

two switches, one terminal of each connected to a common point and to one of the three nodes at which the two capacitor sections in each phase in the delta connection are serially connected, and the other terminals of the switches connected separately to other two of the three nods at which the two capacitor sections in each phase in the delta connection are serially connected;

the two switches in open position making the circuit a delta connected with two capacitor sections in series between phases;

the two switches in closed position making the circuit a star connected circuit with the two capacitor sections in parallel per phase and the common point of connection of the switches as the neutral point.

3. A method of switching in a three phase capacitor bank to configure the circuit either as a three phase delta connected circuit with two serially connected capacitor sections between phases, or, a three phase star connected circuit with two parallel connected capacitor sections per phase, by the operation of switches connected between the neutral point of the star connected circuit and the points of serial connection of the capacitor sections between phases in the delta connection.

* * * * *